Figure 1:
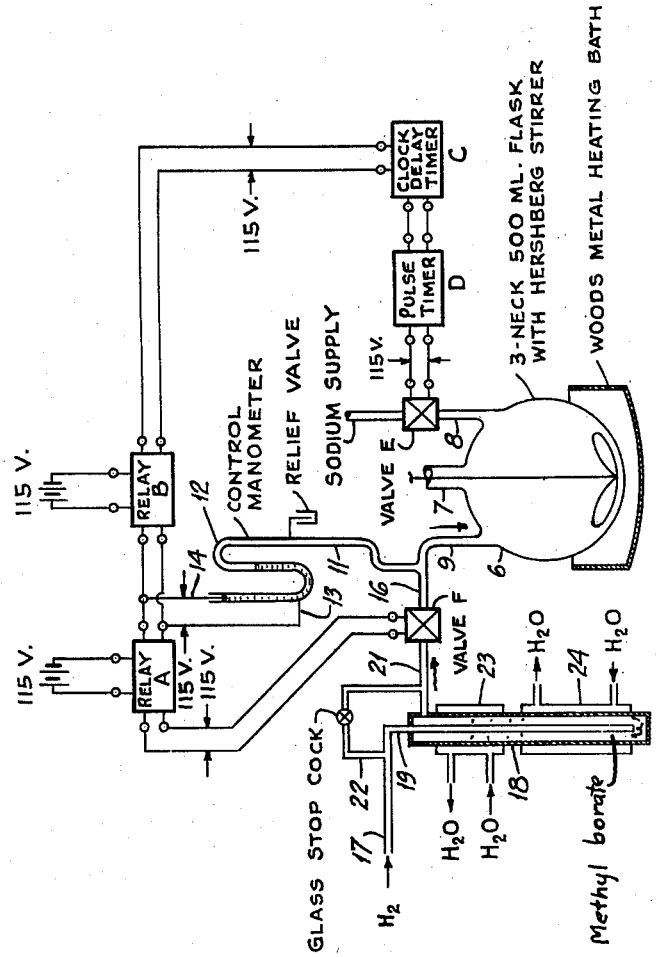

Aug. 4, 1959

W. D. PETERSON 2,898,184

PREPARATION OF BOROHYDRIDES

Filed Aug. 20, 1957

2 Sheets-Sheet 1

INVENTOR.
Willard D. Peterson

ECKHOFF & SLICK
ATTORNEYS

BY
A MEMBER OF THE FIRM

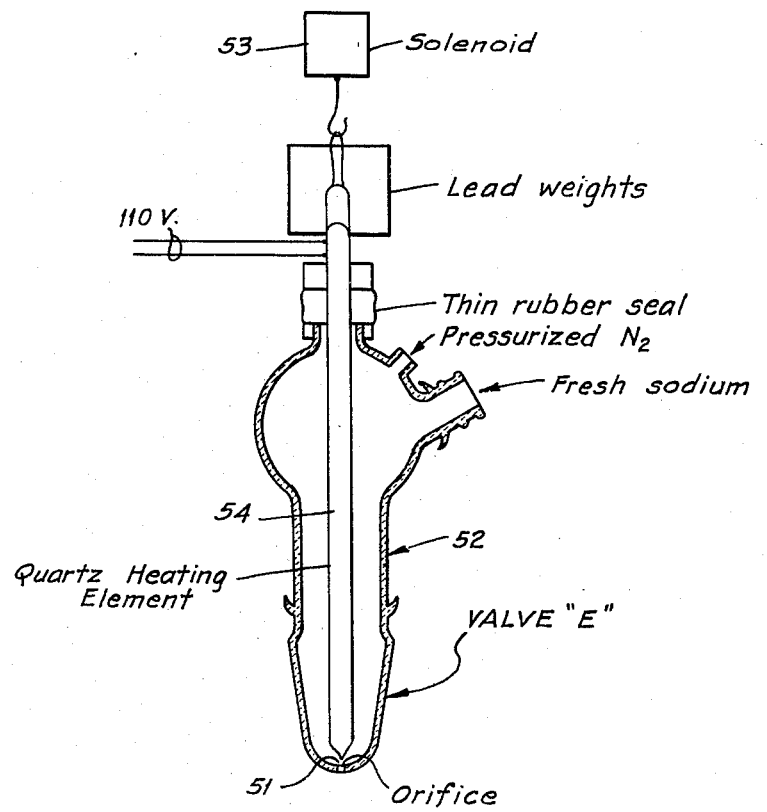

United States Patent Office 2,898,184
Patented Aug. 4, 1959

2,898,184

PREPARATION OF BOROHYDRIDES

Willard D. Peterson, San Marino, Calif., assignor to American Potash & Chemical Corporation, a corporation of Delaware Application August 20, 1957, Serial No. 679,798

4 Claims. (Cl. 23—14)

This invention relates to a process for the preparation of sodium borohydride.

It has been proposed heretofore to produce alkali metal borohydrides by heating a mixture of an alkali metal and an alkyl borate with hydrogen under pressure. With sodium and methyl borate the reaction is as follows:

(1)  $4Na + 2H_2 + (CH_3O)_3B \rightarrow NaBH_4 + 3NaOCH_3$

The temperature required is about 200°–275° C. under a pressure of about 1,000 pounds per square inch measured at 21° C. (set Patent 2,534,533). Schlesinger and co-workers, JACS, 75, 205 (1953), have prepared sodium borohydride by the action of methyl borate upon sodium hydride. However, the heterogeneous and coarse particle size of the commercial sodium hydride employed was reported to lead to inconsistent results.

I have discovered that sodium borohydride can be manufactured directly from sodium, hydrogen and methyl borate at temperatures of the order of 150°–350° C. and in the absence of a liquid under only substantially atmospheric pressure or slightly above. This I have been able to achieve by providing a relatively large mass of finely divided sodium methylate dispersed in a reaction zone and adding relatively small increments of sodium, hydrogen and methyl borate substantially as required by the aforementioned reaction. The hydrogen and methyl borate may be introduced conveniently as a single vapor feed having a molecular composition containing substantially two moles of hydrogen per mole of methyl borate as required by the equation. The increments of addition are preferably relatively small; for example, the increment of sodium should be between about 2% and about 20% of the total mass in the system. The quantity of methyl borate added as an increment should not exceed substantially that required to react with the sodium hydride in situ.

Under these preferred operating conditions the molten sodium wets and disperses upon the extremely high surface of the reaction mass thereby presenting a reactive surface for its conversion to the hydride even at low concentrations and/or low hydrogen pressures in contact with the system. The bulk density of the system is highly favorable to fluidization techniques and averages about 0.6 under optimum circumstances.

In actual operation the sodium methylate generated in the process constitutes about 80 percent of the mass of the system, and in practice it is convenient and expeditious to prepare pure low density sodium methylate in the equipment as an initial step in a fresh start-up of the borohydride reaction. This is done by the action of superheated methanol vapors on molten sodium which is slowly agitated.

Best results for the production of sodium borohydride are obtained when the increments of methyl borate are in close molecular stoichiometric relation to the sodium. If this is not observed then reaction solids will cake and the sodium metal in turn becomes coated and poorly dispersed with a consequent lowering of its reactivity as well as lowering of borohydride yield. Excess methyl borate probably combines with the sodium methylate to form tetramethoxy borohydride:

$(CH_3O)_3B + CH_3ONa \rightleftharpoons NaB(OCH_3)_4$ and the presence of a substantial quantity of this product apparently leads to the formation of a lower melting eutectic, causing caking of the system. This is readily and in fact automatically avoided by a simple mixing of the methyl borate and hydrogen feeds in a manner herein described which regulates the ratio of these two reagents by the temperature of the methyl borate feed reservoir through which the hydrogen passes. The hydrogen entering the system, in turn, reacts stoichiometrically with the available metallic dispersed sodium.

It is in general the object of the present invention to provide a novel process for the manufacture of sodium borohydride.

A further object of the present invention is to provide a process for the continuous manufacture of sodium borohydride from sodium, hydrogen and methyl borate under a relatively low pressure.

Practice of the invention will become further apparent from the following, wherein the present preferred practice of the invention is disclosed. In the drawing accompanying and forming a part hereof, Figure 1 is a schematic representation of an apparatus and a flow sheet which can be suitably employed.

Figure 2 is a side elevation, partly in section, of a liquid sodium feeder.

Referring to the drawing, a reaction zone is provided by a three-neck 500 ml. flask 6 equipped with a Hershberg stirrer, the latter fitting neck 7 on the flask. Molten sodium is supplied from a calibrated reservoir 52 (Figure 2) to the flask through neck 8 under the control of valve E; this valve is controlled by the pulse timer D, the clock delay timer C, and relay B. The third neck 9 on the flask is connected by tubing 11 to a mercury control monometer, generally indicated at 12, and having contacts 13 and 14, provided at spaced points along one leg of the manometer. Neck 9 is connected by tubing 16 to solenoid valve F, the latter controlling the admission of hydrogen line 17 under the control of relay A. Details of the valve E for addition of molten sodium are shown in Figure 2. Its operation depends upon the opening of an orifice 51 in the bottom of a calibrated reservoir 52 of liquid sodium by a solenoid 53 which raises and lowers a weighted heated plunger 54 which also keeps the sodium in reservoir 52 in a molten state.

Methyl borate is supplied from the methyl borate bubbler, generally indicated at 18. A tube 19 extends from the hydrogen line 17 into the methyl borate bubbler, the stream of hydrogen picking up methyl borate and carrying this on to line 21. A by-pass 22 is provided about the methyl borate bubbler so hydrogen can be passed directly into the flask, if desired. The methyl borate bubbler includes two separate water jacketed compartments 23 and 24, the temperature of the water being thermostatically controlled, the lower part of the bubbler being calibrated so that the volume of methyl borate can be measured at any given time.

The electrical components are so arranged in conjunction with the mercury manometer contact 14 that relay A effects opening of valve F controlling the addition of the hydrogen-methyl borate gas stream only when the pressure within the system drops below a preset value (say 40 mm. Hg above atmospheric pressure). Valve E, controlling the intermittent addition of molten sodium operates through relay B and opens only when the pressure within the system has remained at (or slightly above) this preset value for an uninterrupted period of time (say one minute) which is preset in the clock delay timer C. At the end of this period the pulse timer is activated at preset intervals (say ten seconds) which regulates the intermittent addition of small increments of molten sodium as long as the pressure within the system remains at or above the pre-set value. As the added sodium begins to react with the hydrogen the pressure within the system drops breaking the manometer circuit at contract 14 causing the simultaneous deactivation of relay B circuit and activation of relay A circuit. This effects reopening of valve F and an automatic repeat of the cycle.

The alternate additions of molten sodium and the mixed stream of hydrogen and methyl borate are thus automatically controlled by the gas pressure within the reaction flask. The mercury manometer acts as a pressure sensitive switch operating either of the two valves E and F by means of a system of electronic relays and electric timers so arranged that magnetic operated valves control not only the addition of this particular reagent deficient for operation of the process but also the rate and amount added to maintain an optimum and consistent set of conditions within the system.

In actual operation, for example, relay B (controlling the sodium valve circuit) is triggered several times within a single cycle without effecting the addition of sodium. This is because the absorption of the hydrogen by the highly active sodium surface rapidly and repeatedly creates a pressure drop in the system deactivating this relay before the delay timer C runs its course to activate the pulse timer D. Each pressure drop deactivates relay B and this effects a zero re-setting of the delay timer C. Only after substantially complete hydrogenation of the last added increment of sodium has taken place does the pressure within the reacting system remain constant long enough for delay timer C to activate pulse timer D which effects addition of new increments of sodium. The number of increments added depends primarily upon the pre-set intervals of the pulse timer and upon the concentration (or chosen operating pressure) of the hydrogen maintained within the system.

The composition of the hydrogen-methyl borate stream is easily regulated by a combination of the hydrogen pressure and the temperature of the water circulating through the jackets of the reservoir of liquid methyl borate 18 through which the hydrogen bubbles. A stoichiometric ratio of hydrogen to methyl borate is preferred, and for industrial operation it would be advantageous to maintain constant circulation of hydrogen through the methyl borate in order to insure a state of equilibrium in this feed mixture to valve F.

The practice of the invention will become further apparent from the following.

*Example 1.*—Into a reaction flask equipped with manometer controlled valving system, stirrer, and reactant reservoirs as herein described was charged 78 grams of previously prepared sodium methylate upon which was dispersed 2 grams of sodium. This material was prepared by contacting agitated molten sodium with superheated methanol in quantity slightly deficient (about 2 percent) to the stoichiometric amount required for the weight of sodium used.

The system was purged with hydrogen and manometer setting adjusted to 40 millimeters mercury pressure above atmospheric. Agitation and heating were applied when, at about 250° C., the pressure within the flask diminished due to absorption of the hydrogen by the small amount of sodium present on the support of fluidized sodium methylate. This caused automatic opening of the hydrogen-methyl borate feed valve and injection of this mixture to regain the pre-set pressure in the flask. The methyl borate-hydrogen mol ratio was approximately 0.9 to 1. Several repeat injections were made before the pressure remained constant within the flask for the uninterrupted period of one minute pre-set on the clock delay timer circuit controlling the sodium valve. At this point an increment of sodium was automatically added which again created a drop in pressure by absorbing the hydrogen. Rapid repeats of this cycle took place with alternate additions of sodium followed by several increments of the hydrogen-methyl borate mixture. The methyl borate to hydrogen ratio was controlled by circulating water at 55° C. and 38° C. respectively in the lower and upper methyl borate bubbler jackets. The reaction proceeded smoothly and at an average rate of 1.8 equivalents of hydrogen absorption per hour, that is at a rate of 43 gms. of NaH per hour. A light fluffy free flowing product of increased volume was obtained.

At the end of the run there had been added: Sodium (33 grams), hydrogen (15.5 liters S.T.P.) and methyl borate (31.5 grams). This gave 142 grams of product having the following analysis:

| | Weight percent |
|---|---|
| $CH_3ONa$ | 86.5 |
| $NaBH_4$ | 7.8 |
| $NaH$ | 3.0 |
| $Na$ | 2.6 |

*Example 2.*—The above run was repeated with a substantially 1 to 1 mole ratio of methyl borate to hydrogen. This resulted in a decrease in the sodium hydride content of the product and an increase in the sodium borohydride content, the latter approaching the theoretical yield as indicated by the stoichiometry of the reaction.

*Example 3.*—A sodium hydride dispersion was made on previously prepared sodium methylate, the mass weighed 54 grams and was 5% of sodium, 25% NaH and the balance the finely divided methylate. 76 grams of methyl borate were then passed in over a period of twenty-five minutes at 170°–250° C., the temperature at the start being 170° C. The methyl borate was absorbed rapidly as observed by a pressure drop in the system, the feed being discontinued when the pressure commenced to rise. Upon analysis it was found that a 90% conversion of the sodium hydride to sodium borohydride had been effected. The sodium methylate support was prepared by passing superheated methanol vapors (85–100° C.) over stirred molten sodium.

In the foregoing I have dealt largely only with the process as employed with sodium. The process is not limited in this respect and it can be employed with good results and in like manner with the other alkali metals, particularly potassium and lithium. In this connection, each of the above operations was repeated, utilizing potassium and lithium respectivly in place of sodium, suitable adjustment being made for the difference in molecular weight.

I claim:

1. The process comprising maintaining a mass of finely divided dry sodium methylate dispersed in a hydrogen atmosphere in a normally closed reaction zone at 200°–400° C., introducing and dispersing an increment of molten sodium into said zone to react with the hydrogen to form sodium hydride whereby the pressure in said zone is lowered below a predetermined value for a predetermined time interval, introducing an additional increment of hydrogen until the pressure in said zone is raised to a predetermined value for a predetermined time interval, continuing the alternate additions of increments of hydrogen and sodium into said zone until the pressure in said zone remains constant for a predetermined time interval and the dispersion of sodium methylate is coated with sodium hydride.

2. The process comprising maintaining a mass of finely divided dry alkali metal methylate dispersed in a hydrogen atmosphere in a normally closed reaction zone at 200°–400° C., introducing and dispersing an increment of molten alkali metal into said zone to react with the hydrogen to form the hydride of said alkali metal whereby the pressure in said zone is lowered below a predetermined value for a predetermined time interval, introducing an additional increment of hydrogen until the pressure in said zone is raised to a predetermined value for a predetermined time interval, continuing the alternate additions of increments of hydrogen and alkali metal into said zone until the pressure in said zone remains constant for a predetermined time interval and the dispersion of alkali metal methylate is coated with alkali metal hydride.

3. The process comprising maintaining a mass of finely divided dry sodium methylate dispersed in an atmosphere of hydrogen and methyl borate in a normally closed reaction zone at 200°–400° C., introducing and dispersing an increment of molten sodium into said zone to react with the hydrogen and methyl borate to form sodium borohydride whereby the pressure in said zone is lowered below a predetermined value for a predetermined time interval, introducing an additional increment of hydrogen and of methyl borate until the pressure in said zone is raised to a predetermined value for a predetermined time interval, continuing the aforesaid alternate additions of increments of hydrogen and of methyl borate and of sodium into said zone until the pressure in said zone remains constant for a predetermined time interval and the dispersion of sodium methylate is coated with sodium borohydride.

4. The process comprising maintaining a mass of finely divided dry alkali metal methylate dispersed in a methyl borate and hydrogen atmosphere in a normally closed reaction zone at 200°–400° C., introducing and dispersing an increment of molten alkali metal into said zone to react with the hydrogen and methyl borate to form alkali metal borohydride whereby the pressure in said zone is lowered below a predetermined value for a predetermined time interval, introducing an additional increment of methyl borate and of hydrogen until the pressure in said zone is raised to a predetermined value for a predetermined time interval, continuing the alternate additions of increments of hydrogen and of methyl borate and of sodium into said zone until the pressure in said zone remains constant for a predetermined time interval and the dispersion of alkali metal methylate is coated with alkali metal borohydride.

References Cited in the file of this patent

UNITED STATES PATENTS

| | | |
|---|---|---|
| 2,469,879 | Hurd | May 10, 1949 |
| 2,534,533 | Schlesinger | Dec. 19, 1950 |
| 2,684,888 | Pryde | July 27, 1954 |
| 2,702,740 | Wade | Feb. 22, 1955 |
| 2,744,810 | Jackson et al. | May 8, 1956 |